(12) United States Patent
Kurisu et al.

(10) Patent No.: US 6,761,553 B2
(45) Date of Patent: Jul. 13, 2004

(54) STAMPER REPLACEMENT METHOD AND MOLD FOR FORMING OPTICAL DISKS

(75) Inventors: Masahumi Kurisu, Ibaraki (JP); Masashi Tokumori, Uji (JP); Hideho Ariyoshi, Hirakata (JP); Toshihiko Shibita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 134 days.

(21) Appl. No.: 10/099,171

(22) Filed: Mar. 15, 2002

(65) Prior Publication Data

US 2002/0174531 A1 Nov. 28, 2002

(30) Foreign Application Priority Data

Mar. 15, 2001 (JP) .......................................... 2001-073630

(51) Int. Cl.⁷ ............................................... B29D 11/00
(52) U.S. Cl. ............ 425/182; 425/192 R; 425/DIG. 5; 425/810; 29/428

(58) Field of Search ................................ 425/182, 190, 425/192 R, DIG. 5, 810; 29/402.8, 428, 525.11

(56) References Cited

U.S. PATENT DOCUMENTS

| | | | | |
|---|---|---|---|---|
| 1,576,642 A | * | 3/1926 | Bishop | 425/408 |
| 5,466,145 A | * | 11/1995 | Takahashi | 425/190 |
| 5,516,276 A | * | 5/1996 | Takayama et al. | 425/574 |
| 5,552,098 A | * | 9/1996 | Kudo et al. | 264/106 |

* cited by examiner

*Primary Examiner*—James P. Mackey
*Assistant Examiner*—Donald Heckenberg
(74) *Attorney, Agent, or Firm*—Jordan and Hamburg LLP

(57) ABSTRACT

In a vertical-type molding apparatus, bolts are piercingly provided at symmetrically opposed four locations in a stamper replacement unit and a fixed mold stacked together. These bolts are fastened by a single lever which is operated externally of the mold, whereby the stamper replacement unit is fixed to the fixed mold.

2 Claims, 5 Drawing Sheets

STAMPER REPLACEMENT METHOD AND MOLD FOR FORMING OPTICAL DISKS

BACKGROUND OF THE INVENTION

1. Field of the Invention

The present invention relates to a stamper replacement method adopted in a vertical-type optical disk molding apparatus, by which replacement of a stamper for use in molding an optical disk is performed from outside of a mold on a stamper replacement member basis. The invention also relates to a mold for forming an optical disk.

2. Description of Related Art

Conventionally, in a case where a stamper for use in molding an optical disk such as a CD (compact disc) is directly fitted to a stamper fitting surface of a mold for forming an optical disk, replacement of the stamper has been performed in the interior of the mold. In this case, since the stamper fitting surface, formed as a mirror-finished surface, is likely to sustain a scratch, due care needs to be taken during the operation. Moreover, it is difficult to remove foreign matters, such as dust, entrained in between the stamper and the stamper fitting surface. Thus, after the stamper is fitted to the stamper fitting surface, the quality needs to be checked by performing trial pressing operation. Since stamper replacement, trial pressing, and other operations require much time, there are prepared in advance a multiplicity of stamper replacement units, each of which is constituted by pre-fitting a stamper with a stamper fitting surface. These stamper replacement units, after being subjected to a quality check by trial pressing, are attached to the mold for forming an optical disk. In this way, the stamper replacement operation is performed in an off-line mode.

FIG. 5 is an exploded side sectional view of a mold for forming an optical disk employed in a conventional vertical-type molding apparatus, in which stamper replacement is performed in accordance with the above-described manner. The mold includes a stamper replacement unit 1, a movable mold 2 to which the stamper replacement unit 1 is attached, and a fixed mold 3.

In FIG. 5, the stamper replacement unit 1 is constituted as follows. A stamper 6 is placed on a mirror-finished stamper fitting surface 5 of a mirror insert 4 arranged opposite to the fixed mold 3. The stamper 6 has its central part fixed to the mirror insert 4 by a stamper holder 7, and has its periphery fixed to the same by a peripheral ring 8. At the periphery of the stamper replacement unit 1 is attached a rotary ring 9 for fitting the unit 1 to the movable and fixed molds 2 and 3. The movable mold 2 includes a mirror insert 10 which has its surface facing the stamper 6 formed as a mirror-finished surface. The mirror insert 10 has a bolt 11 implanted at the periphery thereof, the bolt which is engaged with the rotary ring 9 to attach the stamper replacement unit 1 to the movable mold 2. The fixed mold 3 includes a plate 12 having a bolt 13 implanted at the periphery thereof. The bolt 13 is engaged with the rotary ring 9 to attach the stamper replacement unit 1 to the fixed mold 3.

The mold for forming an optical disk thus constituted is used as follows. Firstly, the stamper replacement unit 1 is manually attached to the movable mold 2 and placed in position. Subsequently, the movable and fixed molds 2 and 3 are closed, and the rotary ring 9 attached to the stamper replacement unit 1 is driven to rotate, so as for the bolt 13 of the fixed mold 3 to engage in an engagement hole of the rotary ring 9. Thereby, the stamper replacement unit 1 is attached to the fixed mold 3. Lastly, the bolt 13 is fastened using a wrench, at its side facing the parting surface of the fixed mold 3. Hereupon, attachment of the stamper to the fixed mold 3 is completed.

However, the conventional stamper replacement method and mold for forming an optical disk described above have the following disadvantages. Since the stamper replacement unit is manually attached to the mold in the interior of the mold by a worker, there is a possibility that the stamper replacement unit is attached to the mold in a slanting state inadvertently, or that the mirror-finished surface of the mirror insert of the movable mold sustains a scratch. Hence, the worker is required to carry out the manual operation with considerable care, and therefore a great deal of time needs to be spent in replacing the stamper.

SUMMARY OF THE INVENTION

The present invention has been devised in light of the above-mentioned problems, and accordingly its object is to provide a stamper replacement method and a mold for forming an optical disk employed in a vertical-type molding apparatus, by which a stamper replacement unit is attached to a mold from the outside of the mold, and a stamper is replaced with ease in a short period of time.

To achieve the above object, according to one aspect of the present invention, there is provided a stamper replacement method including the steps of: placing a stamper replacement unit, which has a stamper pre-mounted therein, on a movable mold; performing clamping in between the movable mold and a fixed mold; and fixedly attaching the stamper replacement unit to the fixed mold by: operating a single driving lever externally of the mold to drive two pieces of cam plates to slide within a groove provided in the fixed mold, the cam plates being attached to the driving lever in a shape of a letter "C"; and fastening fixing bolts by the cam plates, the fixing bolts being piercingly provided at symmetrically opposed four locations in the stamper replacement unit and the fixed mold stacked together.

According to another aspect of the invention, there is provided a mold for forming an optical disk including: a stamper replacement unit having a stamper pre-mounted therein; a movable mold; a fixed mold; fixing bolts piercingly provided at symmetrically opposed four locations in the stamper replacement unit and the fixed mold stacked together, the bolts for fixing the stamper replacement unit to the fixed mold; two pieces of cam plates including: a rack for rotating a screw portion of the bolt by threadedly engaging with the screw portion; and a tapered face for pushing the bolt upward so as for the stamper replacement unit to be clamp-fixed to the fixed mold; and a single driving lever for operating the two cam plates externally of the mold.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
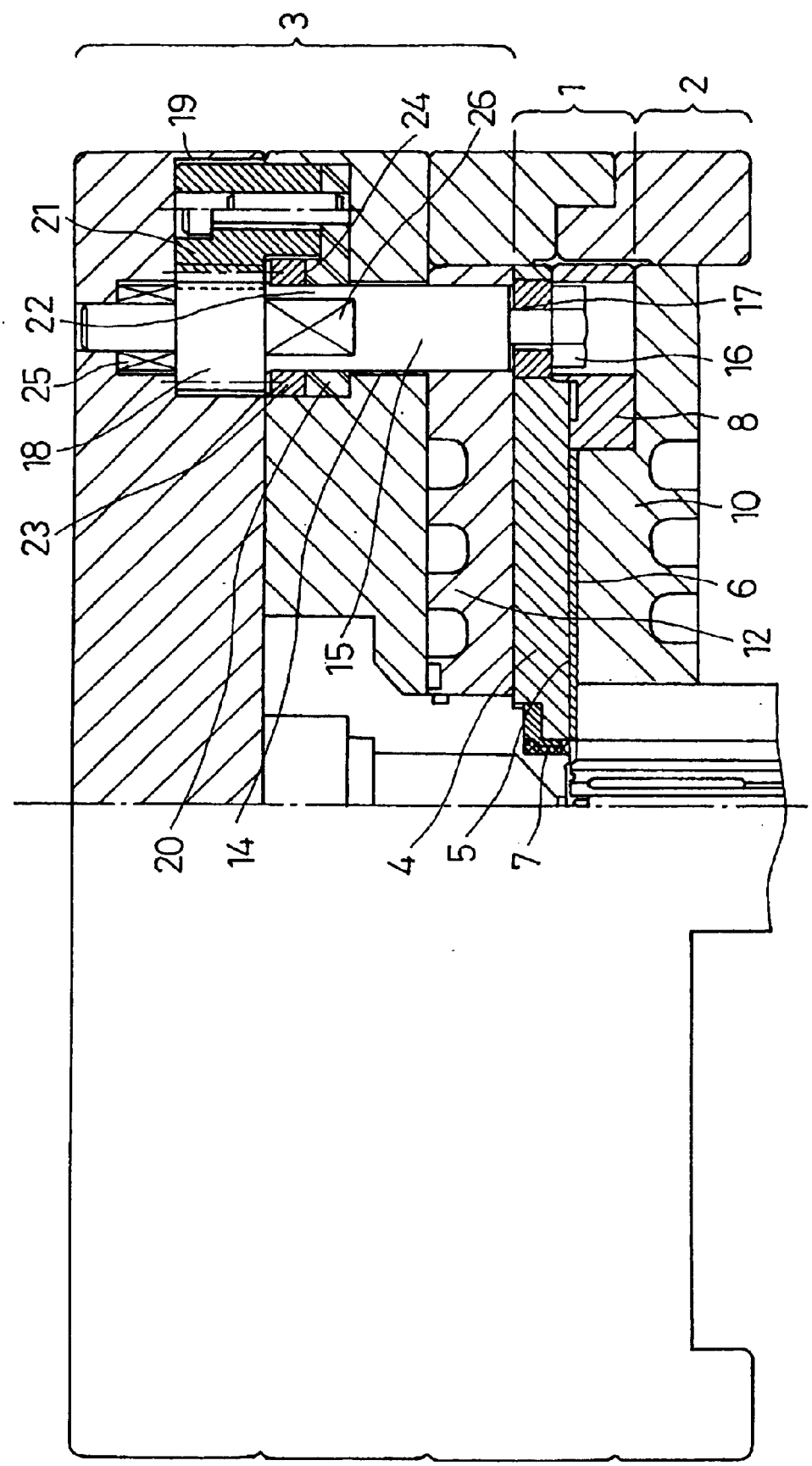
FIG. 1 is a side sectional view of a mold for forming an optical disk, in an assembled state, employed in a vertical-type molding apparatus according to one embodiment of the present invention.

Hereinafter, an embodiment of the present invention will be described with reference to the drawings.

In FIGS. 1 to 4, reference numeral 1 represents a stamper replacement unit. The stamper replacement unit 1 is constituted as follows. A stamper 6 is placed on a mirror-finished stamper fitting surface 5 of a mirror insert 4 arranged opposite to a fixed mold 3. The stamper 6 has its central part fixed to the mirror insert 4 by a stamper holder 7, and has its periphery fixed to the mirror insert 4 by a peripheral ring 8. Reference numeral 2 represents a movable mold provided with a mirror insert 10 having its surface facing the stamper 6 formed as a mirror-finished surface. On the mirror insert 10 is implanted a guide pin 33. Reference numeral 3 represents a fixed mold provided with a plate 12. Reference numeral 14 represents through holes formed at symmetrically opposed four locations in the stamper replacement unit 1 and the fixed mold 3, in a state where the stamper replacement unit 1 is sandwiched between the movable mold 2 and the fixed mold 3. Reference numeral 15 represents a bolt which is inserted into each of the four through holes 14. The bolt 15 has at its lower end a T-shaped portion 16 which passes through a slot 17 of the stamper replacement unit 1 so as to protrude toward the under surface of the unit 1. Besides, the bolt 15 has in its upper part a screw portion 18 which is engaged with a rack 21. The rack 21 slides in synchronization with a cam plate 20 which slides within a groove 19 of the fixed mold 3. Reference numeral 22 represents a slot formed in the cam plate 20, through which the bolt 15 passes, and reference numeral 23 represents a ring-shaped wedge fitted to a part of the bolt 15 located between a tapered face 24 of the cam plate 20 and a shoulder portion of the screw portion 18 of the bolt 15. Reference numeral 25 represents a spring for urging the bolt 15 in a downward direction; reference numeral 26 represents a spring for urging the bolt 15 in an upward direction; and reference numeral 27 represents a coupling block for coupling the two cam plates 20 together so as to form the shape of a letter "C". Reference numeral 28 represents a driving lever formed so as to pass through the central part of the coupling block 27. The driving lever 28 is made rotatable, but is inhibited from moving axially with respect to the coupling block 27. Reference numeral 29 represents a screw portion formed at the front end of the driving lever 28, the portion which is engaged in a screw hole 30 of the fixed mold 3. Reference numeral 31 represents a spring fitted to the driving lever 28, for urging the driving lever 28 in such a direction as to move the fixed mold 3 and the coupling block 27 away from each other. The stamper replacement unit 1 has an insertion hole 32 formed at the position away from the through hole 14.

Figure 4:
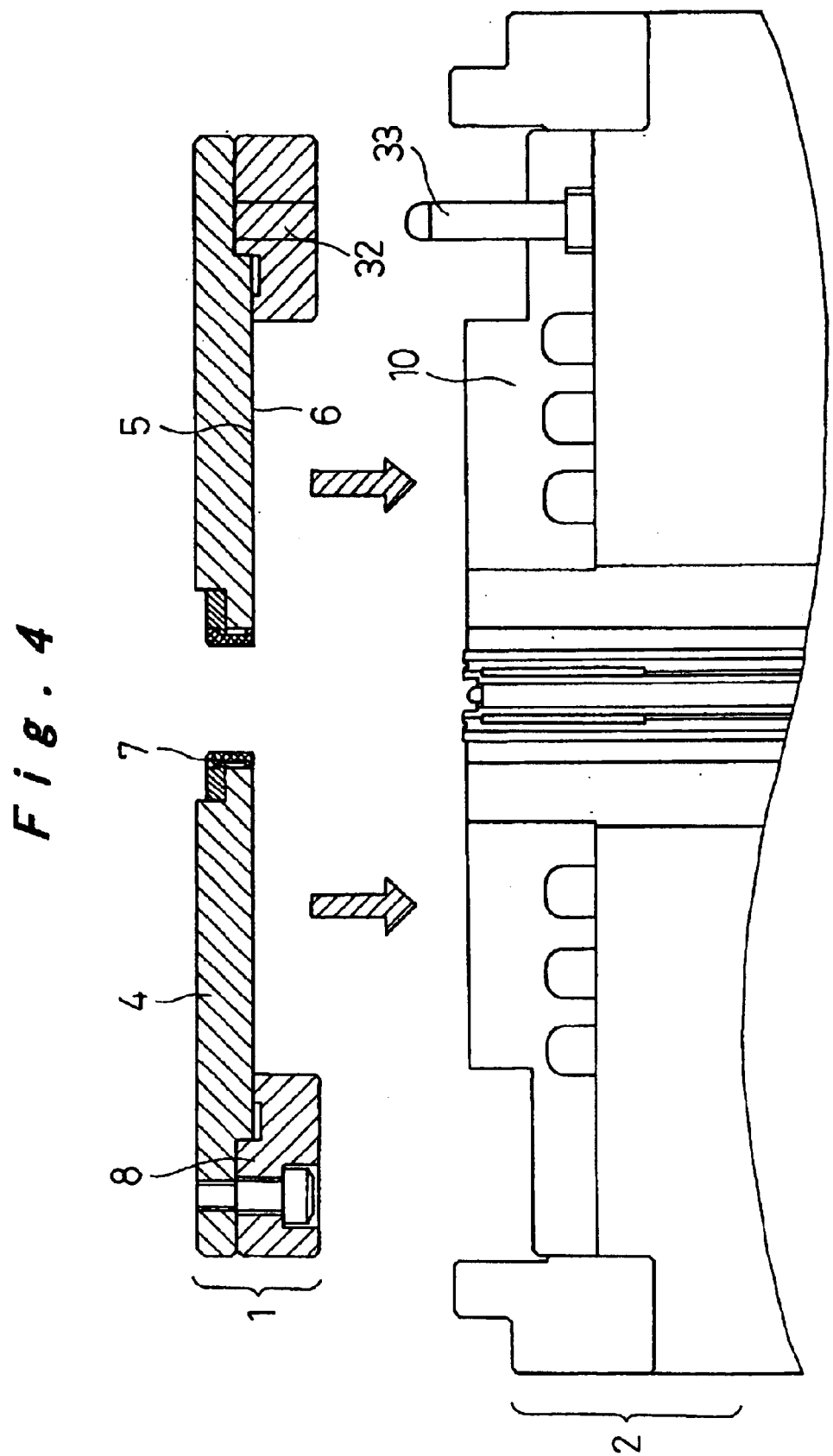
FIG. 4 is a partial side sectional view showing how the mold is assembled.
Figure 5:
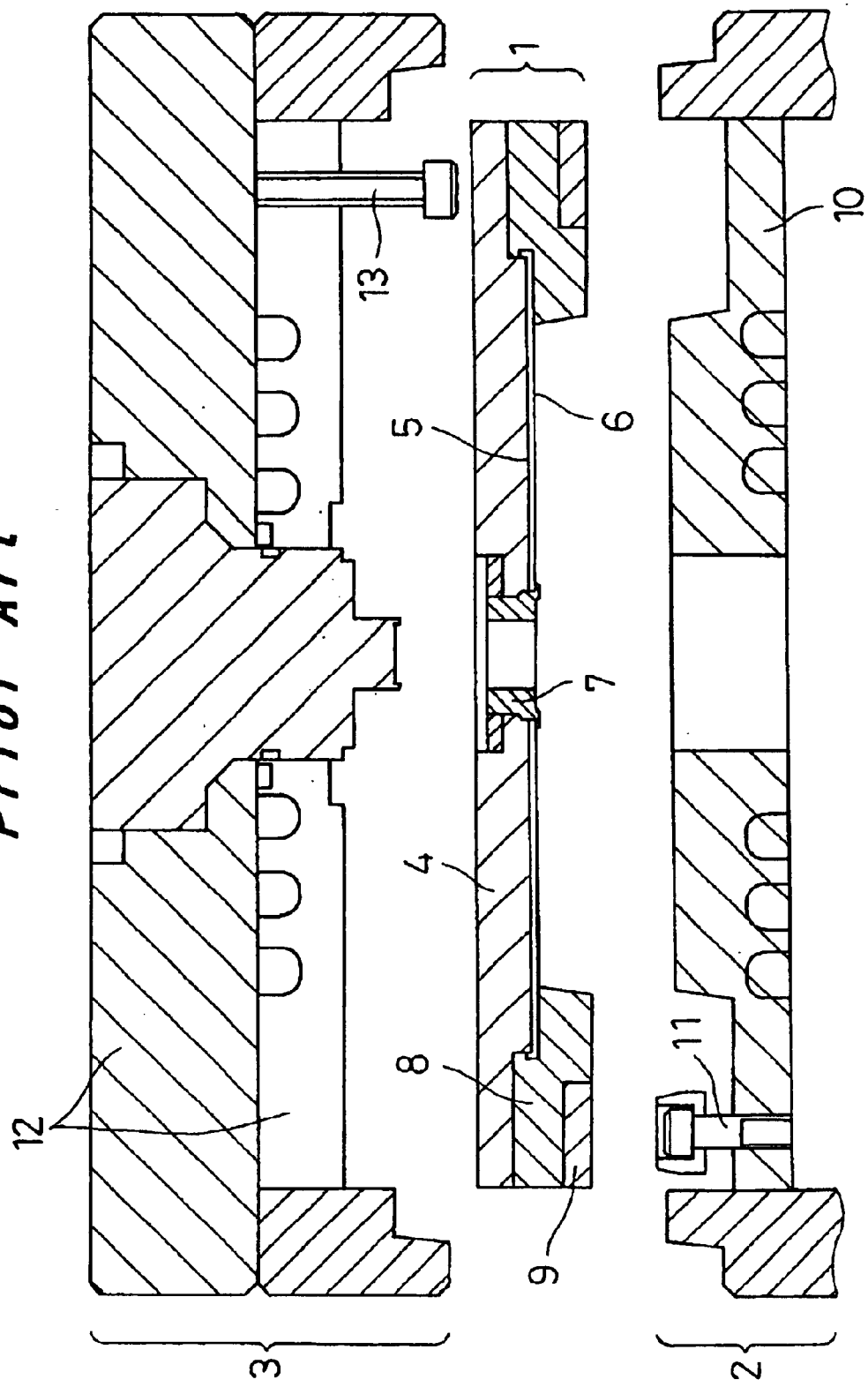
FIG. 5 is an exploded side sectional view of a conventional mold for forming an optical disk employed in a vertical-type molding apparatus.

The above-described mold for forming an optical disk employed in a vertical-type molding apparatus is assembled as follows. Firstly, as shown in FIG. 4, the guide pin 33 of the movable mold 2 is inserted into the insertion hole 32 of the stamper replacement unit 1, whereby the stamper replacement unit 1 is positioned and placed on the mirror insert 10 of the movable mold 2. Subsequently, clamping is performed once in between the movable mold 2 and a fixed mold 3.

Next, the stamper replacement unit 1, now just placed on the mirror insert 10, is attached to the fixed mold 3 by the operation from the outside of the mold.

Figure 2:
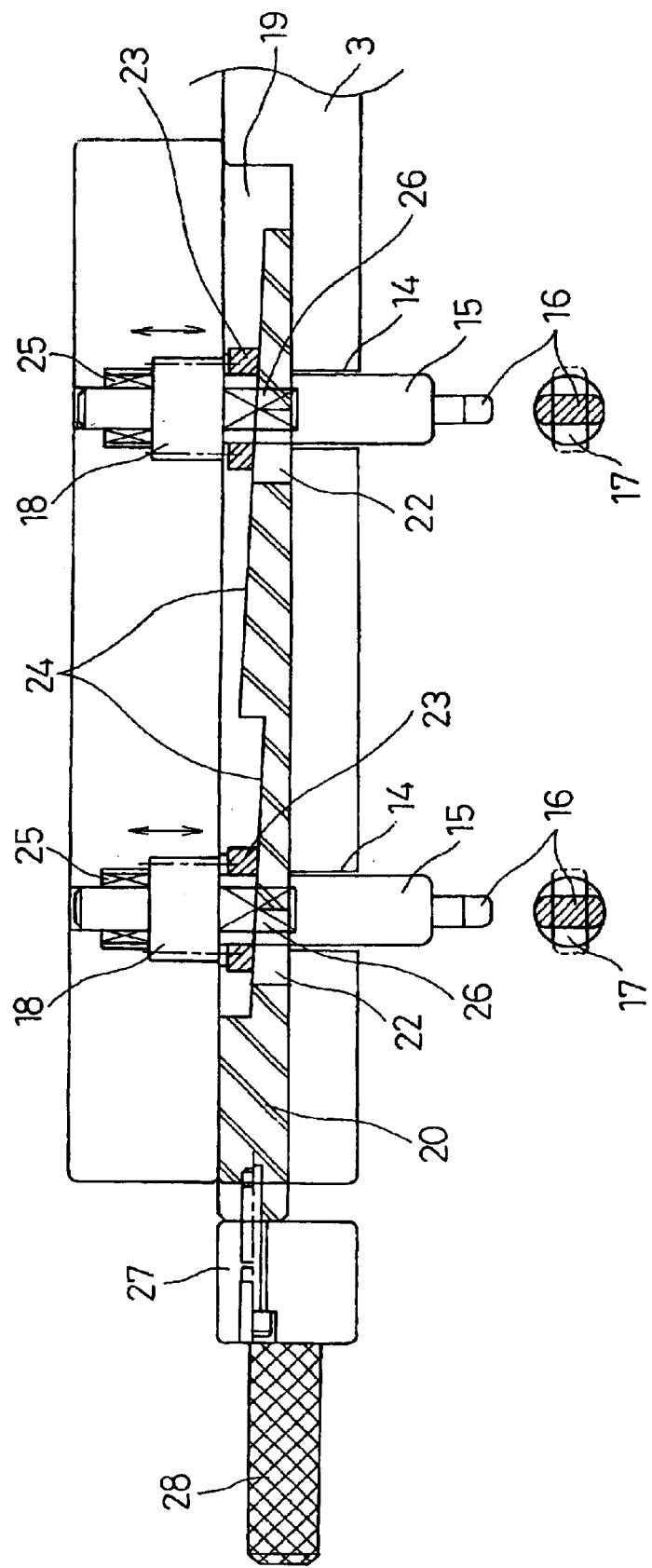
FIG. 2 is a partial side sectional view of the mold for forming an optical disk.
Figure 3:
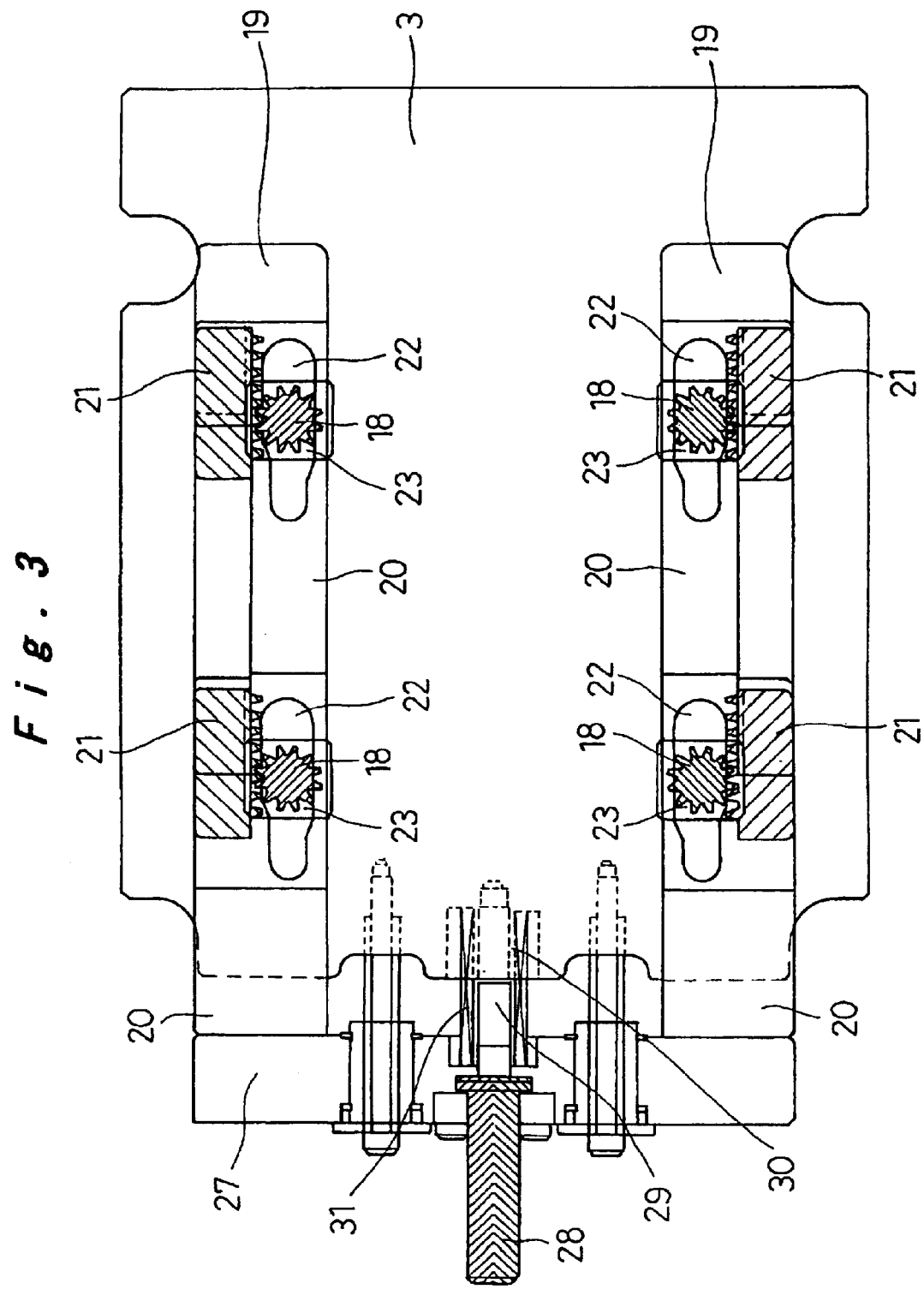
FIG. 3 is a partial top plan view of the mold.

Referring to FIGS. 2 and 3, as the driving lever 28 is moved forward while being rotated, against a resilient force exerted by the spring 31, the screw portion 29 at the front end is brought into engagement in the screw hole 30 of the fixed mold 3. This screw-engagement is continued until the coupling block 27 is moved forward concurrently with the driving lever 28. Then, the two cam plates 20 coupled to the block 27 are driven to slide within the groove 19 of the fixed mold 3, whereby the four racks 21, sliding in synchronization with the cam plates 20, are threadedly engaged with their corresponding screw portions 18 of the four bolts 15, driving the bolts 15 to rotate.

As shown in FIG. 1, the rotation of the bolt 15 causes the T-shaped portion 16 thereof, now protruding toward the under surface of the stamper replacement unit 1 through the slot 17, to rotate 90 degrees so as to be crossed with respect to the slot 17. At the same time, the tapered face 24 of the cam plate 20 slides to fasten the ring-shaped wedge 23, whereby the shoulder portion of the screw portion 18 of the bolt 15 is loaded with a force that tends to move it upward, allowing the bolt 15 to move upward against the urging force of the spring 25. Thereupon, the crossing engagement of the T-shaped portion 16 with respect to the slot 17 of the stamper replacement unit 1 is secured. This securement is achieved at each of the four positions, at one time, where the bolts 15 are provided in the stamper replacement unit 1 and the fixed mold 3 stacked together. Consequently, a mold for forming an optical disk as shown in FIG. 1 is realized.

As described thus far, with the stamper replacement method and the mold for forming an optical disk according to the embodiment under discussion, the stamper replacement unit 1 is secured to the fixed mold 3 simply by rotatingly moving the driving lever 28 externally of the mold. Besides, the stamper replacement unit 1 is fixed to the fixed mold 3 by fastening the four bolts 15 arranged symmetrically using the two cam plates 20 to be driven by the driving lever 28. Thereby, well-balanced clamp-fixing of the stamper replacement unit 1 to the fixed mold 3 is achieved.

Note that, to remove the stamper replacement unit 1 from the fixed mold 3, the above-described procedure is reversed in sequence.

As described heretofore, according to the stamper replacement method and the mold for forming an optical disk embodying the present invention, the operation for attaching the stamper replacement unit, having a stamper pre-mounted therein, to the mold is performed simply by operating a single driving lever externally of the mold. Thus, replacement of stampers is performed with ease in a shorter period of time.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A stamper replacement method adopted in a vertical-type molding apparatus, comprising:
    placing a stamper replacement unit, which has a stamper pre-mounted therein, on a movable mold;
    performing clamping in between the movable mold and a fixed mold; and
    fixedly attaching the stamper replacement unit to the fixed mold by a procedure including:

operating a single driving lever from outside of the mold to drive two pieces of cam plates attached to the driving lever to slide within a groove of the fixed mold; and fastening fixing bolts by the cam plates, the fixing bolts being piercingly provided at symmetrically opposed four locations in the stamper replacement unit and the fixed mold stacked together.

2. A mold for forming an optical disk comprising:

a stamper replacement unit having a stamper pre-mounted therein;

a movable mold;

a fixed mold;

fixing bolts piercingly provided at symmetrically opposed four locations in the stamper replacement unit and the fixed mold stacked together, the bolts for securing the stamper replacement unit to the fixed mold;

two pieces of cam plates including: a rack for rotating a screw portion of the bolt by engaging with the screw portion; and a tapered face for pushing the bolt upward so as for the stamper replacement unit to be clamp-fixed to the fixed mold; and a single driving lever for operating the two cam plates externally of the mold.

* * * * *